United States Patent [19]
Jain et al.

[11] Patent Number: 6,005,782
[45] Date of Patent: Dec. 21, 1999

[54] FLYBACK CONVERTER WITH SOFT SWITCHING USING AUXILIARY SWITCH AND RESONANT CIRCUIT

[75] Inventors: Praveen K. Jain, Pointe-Claire; Yan-Fei Liu, Kanata; Youhao Xi, Montreal, all of Canada

[73] Assignees: Nortel Networks Corporation; Concordia University, both of Montreal, Canada

[21] Appl. No.: 09/173,034

[22] Filed: Oct. 16, 1998

[51] Int. Cl.$^6$ .............. H02M 1/12; H02M 3/24; G05F 1/10

[52] U.S. Cl. .............. 363/21; 363/41; 363/97; 323/235

[58] Field of Search .............. 363/20, 21, 40, 363/41, 95, 97, 131; 323/234, 235

[56] References Cited

U.S. PATENT DOCUMENTS

| | | | |
|---|---|---|---|
| 5,038,264 | 8/1991 | Steigerwald | 363/21 |
| 5,140,510 | 8/1992 | Myers | 363/98 |
| 5,159,541 | 10/1992 | Jain | 363/26 |
| 5,208,738 | 5/1993 | Jain | 363/17 |
| 5,418,704 | 5/1995 | Hua et al. | 363/21 |
| 5,570,278 | 10/1996 | Cross | 363/20 |
| 5,796,595 | 8/1998 | Cross | 363/16 |
| 5,805,432 | 9/1998 | Zaitsu et al. | 363/16 |

OTHER PUBLICATIONS

"A Zero Voltage Switching Flyback Converter Topology", Y. Xi et al., IEEE PESC '97 Record, pp. 951–957 No Date.
"A Zero Voltage Switching Forward Converter Topology", Y. Xi et al., INTELEC 97, pp. 116–123, Melbourne Australia, Oct. 19–23, 1997.

*Primary Examiner*—Peter S. Wong
*Assistant Examiner*—Bao Q. Vu
*Attorney, Agent, or Firm*—R. John Haley

[57] ABSTRACT

A flyback converter has a main switch coupling a primary winding of a transformer between supply terminals, a duty cycle of the main switch controlling an output of the converter derived from a secondary winding of the transformer. Soft (zero voltage) switching of the main switch is facilitated by a snubber capacitor in parallel with the main switch. An auxiliary circuit coupled in parallel with the snubber capacitor and main switch includes a series-connected auxiliary switch, capacitor, and inductor coupled via another inductor to a full wave rectifier arrangement for recovering energy from the snubber capacitor. Resonant circuits provided by the auxiliary circuit facilitate soft switching of the auxiliary switch for low power loss and high frequency operation. The switches can be MOSFETs with reverse-poled diodes in parallel with their drain-source paths.

20 Claims, 3 Drawing Sheets

FLYBACK CONVERTER WITH SOFT SWITCHING USING AUXILIARY SWITCH AND RESONANT CIRCUIT

This invention relates to flyback converters, and is particularly concerned with flyback converters with soft switching.

BACKGROUND OF THE INVENTION

A generally preferred form of soft switching, also referred to as lossless switching, is zero voltage switching (ZVS), in which a switching device is turned on and off at times when there is little or no voltage across the device. Another form of soft switching is zero current switching (ZCS), in which a switching device is turned on and off at times when its current during the switching is very small or zero. In each case, power losses due to the switching are relatively very small. Soft switching provides the advantages of increased efficiency and reduced power losses of the converter, and reduced electromagnetic interference (EMI). Consequently it becomes possible to operate the converter at a higher switching frequency, enabling the use of smaller components.

"A zero voltage switching flyback converter topology" by Y. Xi et al., IEEE PESC '97 Record, pages 951–957 describes a flyback converter which includes an auxiliary circuit to facilitate ZVS of the main switch of the converter. The auxiliary circuit includes a snubber capacitor in parallel with the main switch, two coupled inductors forming an auxiliary transformer for recovering energy of the snubber capacitor, and an auxiliary switch. However, in this converter energy associated with leakage inductance of the auxiliary transformer is not recovered, and turn-off of the auxiliary switch is not under ZVS or ZCS conditions, so that there are still power losses which limit the operation of the converter at very high frequencies.

Objects of this invention are to provide an improved flyback converter and an improved method of operating a flyback converter.

SUMMARY OF THE INVENTION

According to one aspect of this invention there is provided a method of operating a flyback converter comprising a main switch, coupled in series with a primary winding of a transformer to supply voltage terminals, an output circuit coupled to a secondary winding of the transformer for providing an output voltage of the converter controlled by a duty cycle of the main switch, and a snubber capacitor for the main switch, comprising the steps of, in each switching cycle of the flyback converter: turning on an auxiliary switch when the main switch is off to provide a resonant circuit comprising the snubber capacitor and a capacitance and an inductance coupled in series with the auxiliary switch, thereby to reduce a voltage of the main switch to substantially zero; turning on the main switch while its voltage is substantially zero; maintaining a resonant circuit of the capacitance and the inductance via the auxiliary switch and the main switch after the voltage of the main switch is substantially zero, whereby a current of the inductance reverses polarity at a first zero value and reaches a second zero value; turning off the auxiliary switch at or after the first zero value and before or at the second zero value of the current of the inductance; turning off the main switch at a time determined by the duty cycle; and recovering energy from the inductance.

Another aspect of the invention provides a flyback converter comprising: a transformer having primary and secondary windings; a main switch coupled in series with the primary winding between supply voltage terminals; an output circuit coupled to the secondary winding for providing an output voltage of the converter controlled by a duty cycle of the main switch; a snubber capacitor coupled to the main switch for reducing a rate of change of voltage of the main switch; and an auxiliary circuit for recovering energy from the snubber capacitor, the auxiliary circuit comprising: an auxiliary switch, an auxiliary capacitor, and a first inductor coupled in series to provide a resonant circuit with the snubber capacitor when the auxiliary switch is on and to maintain a resonant circuit of the auxiliary capacitor and the inductor after the main switch is turned on; a second inductor coupled to the first inductor; and a full wave rectifier arrangement coupled to the second inductor.

Preferably each of the main and auxiliary switches comprises a switching path and an oppositely-poled diode in parallel with the switching path. For example each of the main and auxiliary switches can comprise a MOSFET having a reverse-poled body diode in parallel with its drain-source path.

In preferred embodiments of the flyback converter as described below, the snubber capacitor and the auxiliary circuit are coupled in parallel with the main switch.

Another aspect of this invention provides a flyback converter comprising: a first capacitor connected between supply voltage terminals; a transformer having primary and secondary windings; a main switch comprising a MOSFET having a drain-source path coupled in series with the primary winding between the supply voltage terminals, a reverse-poled diode in parallel with the drain-source path, and a gate for receiving a first control signal; an output circuit coupled to the secondary winding for providing an output voltage of the converter controlled by a duty cycle of the first control signal; a snubber capacitor coupled in parallel with the main switch; and an auxiliary switch, a second capacitor, and a first inductor, coupled in series with one another in parallel with the main switch and the snubber capacitor, the auxiliary switch comprising a MOSFET having a drain-source path, a reverse-poled diode in parallel with the drain-source path, and a gate for receiving a second control signal.

This flyback converter preferably includes a second inductor coupled to the first inductor, and a full wave rectifier arrangement coupling the second inductor to the first capacitor. Alternatively, this flyback converter can include auxiliary output terminals, a third capacitor connected between the auxiliary output terminals, a second inductor coupled to the first inductor, and a full wave rectifier arrangement coupling the second $$isec(t) = Is - \frac{n^2 Vo}{Lm}(t - t6) \quad (14)$$

$$Is = n\sqrt{\left(\frac{ViD}{fLm}\right)^2 - \frac{Cs}{Lm}(Vi + nVo)^2} \approx \frac{nViD}{fLm} \quad (15)$$

Interval 6 ends when the secondary winding current isec reaches zero, at the time t7 determined from equation (14) above.

Interval 7 (t7 to t1+T)

At the time t7, the stored energy of the transformer 16 has been completely transferred to the capacitor 20 and the load, and the diode 18 again becomes reverse biased and load current is again supplied by the capacitor 20. Thus the converter operates in the discontinuous conduction mode which is preferred for stability. The drain voltage of the main switch is no longer clamped, and a resonance starts in the network consisting of the inductance Lm, capacitance Cs of the snubber capacitor 26, and the supply line including the capacitor 22. This resonance results in the drain voltage v1 of the main switch 14 being determined by:

$$v1(t) = Vi + nVo \cos[\omega_o(t-t7)] \quad (16)$$

At the end of Interval 7, $t = t1 + T$, v1 reaches the steady state initial voltage Vd, given by:

$$Vd = Vi + nVo \cos[\omega_o(t1+T-t7)] \quad (17)$$

The current associated with this process is given by $$im(t) = -nVo\sqrt{\frac{Cs}{Lm}} \sin[\omega_o(t-t7)] \quad (18)$$

Since Lm is usually much larger than La, as can be seen from equations (18) and (3), im is negligible and hence ignored in the above description for Interval 1.

Following Interval 7, the operating sequence described above is repeated in subsequent cycles.

The duty cycle Da of the control signal G2, and hence of the auxiliary switch 24, is limited by:

$$(1-2Dmin) \geq Da \geq (1-2Dmax) \quad (19)$$

where Dmin and Dmax are the minimum and maximum values, respectively, of the duty cycle D of the main switch 14. Typically Da may be between about 0.07 and 0.1. The capacitance Cs of the snubber capacitor 26 controls the rise time of v1 when the main switch 14 is turned off. In order not to adversely affect the resetting of the magnetic core of the transformer 16, Cs is limited by:

$$Cs \leq \frac{(1-2Dmax-Da)DmaxVmin}{f^2 Lm(Vmin + nVo)} \quad (20)$$

where Vmin is the minimum value of the supply voltage Vi.

The duration of Interval 3 is limited by the minimum duty cycle Dmin of the main switch 14, which implies that:

$$La \leq \frac{Dmin^2}{\pi^2 f^2 Ca} \quad (21)$$

On the other hand, equations (6) and (7) above indicate that, in order to reduce conduction losses in the auxiliary switch 24, the inductance La of the inductor 40 should be large. Consequently, the allowable maximum value of La given by equation (21) is preferred. It can be seen that:

$$t3 - t1 = \frac{Da}{f} \quad (22)$$

Substituting equations (4) and (8) into equation (22) enables a value of the capacitance Ca of the capacitor 38 to be determined.

FIGS. 4 and 5 illustrate flyback converters in accordance with other embodiments of the invention. In each case the converters are substantially the same as that of FIG. 2, and operate in a similar manner, except for the recovery of energy via the auxiliary transformer 32, and accordingly only those parts of the converters of FIGS. 4 and 5 that differ from the converter of FIG. 2 are described below.

In the converter of FIG. 4, the full wave rectifier arrangement, constituted in the converter of FIG. 2 by the tapped auxiliary transformer winding formed by the inductors 30a and 30b and the diodes 36 and 42, is replaced by a single inductor 30 and a diode bridge 44 which serves to return energy to the input capacitor 22 in a similar manner. In the converter of FIG. 5, the full wave rectifier arrangement of the converter of FIG. 2 is retained, but instead of being connected to the +V supply terminal 10 it is connected to an auxiliary output voltage terminal 46; a capacitor 48 is also connected between the terminal 46 and the 0V terminal 10 to which the tap between the inductors 30a and 30b is connected. Thus recovered energy from the auxiliary circuit is supplied to the capacitor 48 instead of being returned to the capacitor 22, whereby an auxiliary output voltage, relative to the 0V terminal 10, can be derived from the terminal 46.

It can be appreciated that in the converter of FIG. 5 the junction between the capacitor 48 and the tap between the inductors 30a and 30b need not be connected to the 0V terminal 10 and can instead be isolated therefrom, so that the auxiliary output voltage from the terminal 46 is provided relative to this junction and is electrically floating relative to the supply voltage terminals 10. It can also be appreciated that a diode bridge and single inductor, as described above with reference to FIG. 4, can alternatively be used in the converter of FIG. 5 instead of the inductors 30a and 30b and the diodes 36 and 42. inductor to the third capacitor. In either case the second inductor can comprise a tapped inductor and the full wave rectifier arrangement can comprise two diodes each connected to one end of the second inductor, or the full wave rectifier arrangement can comprise a diode bridge.

The first inductor conveniently comprise two inductors coupled in series, one of said two inductors being inductively coupled to the second inductor.

The invention facilitates the provision of a flyback converter with soft switching of both the main and auxiliary switches under substantially all operating conditions.

BRIEF DESCRIPTION OF THE DRAWINGS

The invention will be further understood from the following description with reference to the accompanying drawings, in which.

DETAILED DESCRIPTION

Figure 1:
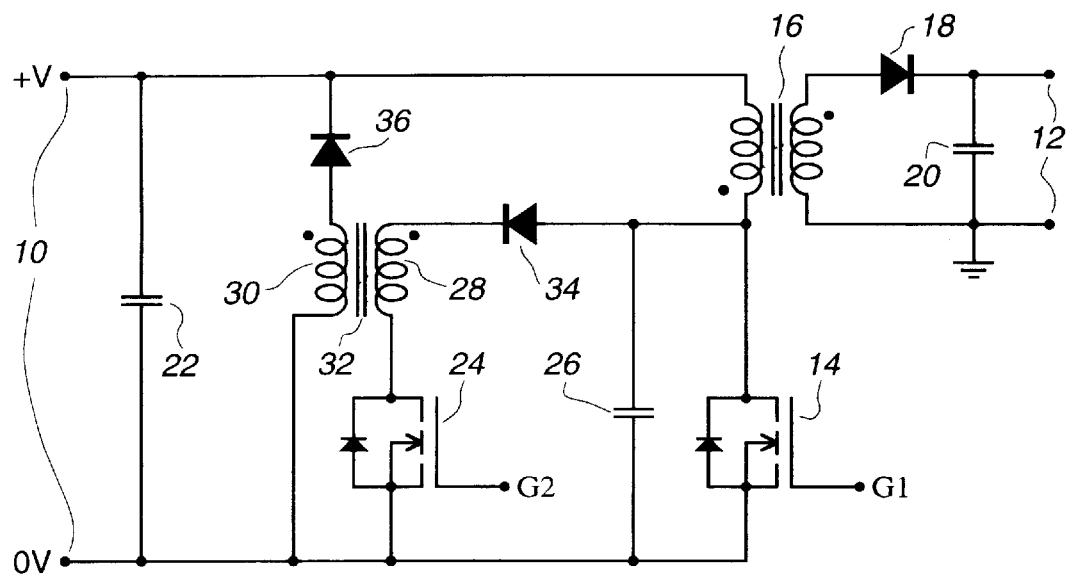
FIG. 1 schematically illustrates a known flyback converter.

Referring to FIG. 1, a flyback converter known from the PESC '97 Record referred to above is illustrated. The converter provides from an input or source voltage +V, relative to a zero voltage of 0V, supplied at DC supply terminals 10 a desired output voltage at DC output terminals 12 for supply to a load (not shown). A control circuit (not shown) serves to supply a pulsed control signal G1 to a main switch 14 of the converter for maintaining the output voltage at its desired level using duty cycle control in known manner. The main switch is an N-channel MOSFET, which is illustrated with its parasitic or body diode connected in parallel with the drain-source path, to the gate of which the control signal G1 is supplied.

The converter includes a transformer 16 having primary and secondary windings the senses of which are represented conventionally in FIG. 1 by dots adjacent to the windings. The primary winding and the main switch 14 are connected in series between the supply terminals 10. One end of the secondary winding is connected to ground and to a grounded one of the output terminals 12, and the other end of the secondary winding is connected via a diode 18 to the other of the output terminals 12. A capacitor 20 is connected between the output terminals 12, and another capacitor 22 is connected between the supply terminals 10.

As so far described, the converter is a well-known flyback converter with hard switching. Soft switching of the main switch 14 is facilitated by the remainder of the circuit shown in FIG. 1, constituting an auxiliary circuit which comprises an auxiliary switch 24, a snubber capacitor 26, coupled inductors 28 and 30 forming an auxiliary transformer 32 sensed as shown by dots, and diodes 34 and 36. The snubber capacitor 26 is connected in parallel with the main switch 14. In parallel with the snubber capacitor 26, the diode 34, inductor 28, and auxiliary switch 24 are connected in series. The auxiliary switch is also an N-channel MOSFET, illustrated with its parasitic or body diode connected in parallel with its drain-source path, to the gate of which a control signal G2 is supplied from the control circuit. The inductor 30 and diode 36 are connected in series between the supply terminals 10, for returning energy to the capacitor 22.

In operation of the converter of FIG. 1, the auxiliary switch 24 is controlled by the control signal G2 to turn on before, and to turn off simultaneously with, turn on of the main switch 14 under the control of the control signal G1. The snubber capacitor 26 provides for ZVS turn-off of the main switch 14, and ZVS turn-on of the main switch 14 is achieved by timing this to be when a zero voltage across the snubber capacitor 26 has been reached by a resonant discharge of the snubber capacitor 26 via the diode 34, inductor 28, and turned-on auxiliary switch 24. Thus there can be ZVS of the main switch 14 for turn-on and turn-off. However, while the auxiliary switch 24 is turned on under zero current conditions because it is in series with the inductor 28, its turn-off is not under zero voltage or zero current conditions, so that it results in a switching loss. This loss increases with increasing switching frequency, so that it undesirably limits the switching frequency and efficiency of the converter.

The diode 34 in the converter of FIG. 1 is necessary to ensure that, in the event that the current in the inductor 30 and the diode 36 falls to zero before the main switch 14 is turned off, a drain-source capacitance of the auxiliary switch 24 is not discharged via the inductor 28 and main switch 14, resulting in undesired switching loss. Although this diode 34 can be omitted if it can be ensured that the main switch 14 is turned off before the current in the inductor 30 and the diode 36 falls to zero, this imposes undesired restrictions on the duty cycle of the main switch 14 and hence upon the operating conditions of the converter. For a converter operating with a variable supply and/or load, this condition can not be ensured and the diode 34 must be present.

Figure 2:
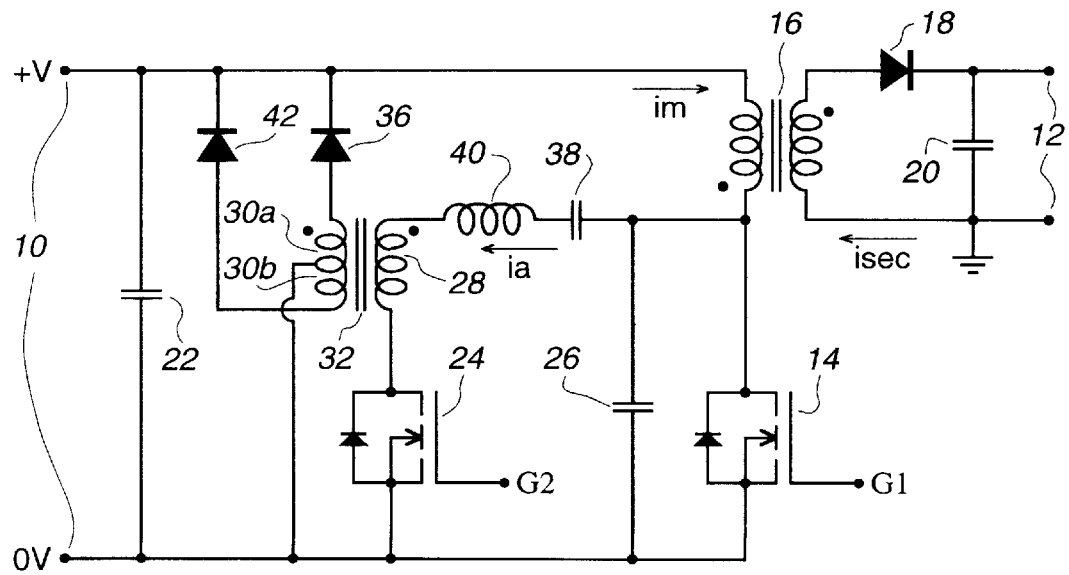
FIG. 2 schematically illustrates a flyback converter in accordance with an embodiment of this invention.

FIG. 2 schematically illustrates a flyback converter in accordance with an embodiment of this invention, the same references as in FIG. 1 being used to denote corresponding elements. The converter of FIG. 2 differs from that of FIG. 1 in particular in that the diode 34 of the converter of FIG. 1 is omitted, an auxiliary capacitor 38 and an inductor 40 instead being connected in series with the inductor 28 and auxiliary switch 24, and the timing of the control signals G1 and G2 for the switches is as described below. In addition, in the converter of FIG. 2 the inductor 30 of the converter of FIG. 1 is replaced by a tapped inductor or auxiliary transformer winding comprising inductors 30a and 30b with a tap therebetween which is connected to the 0V supply terminal 10. The diode 36 is connected between the other end of the inductor 30a and the +V supply terminal 10 in a similar manner to the arrangement of the inductor 30 and diode 36 in the converter of FIG. 1. The diode 42 is connected between the other end of the inductor 30b and the +V supply terminal 10, also for returning energy to the capacitor 22 as described below, the diodes 36 and 42 thus providing a full wave rectifier arrangement.

The operation of the flyback converter of FIG. 2 is described in detail below with additional reference to FIG. 3 which illustrates, diagrammatically and not to scale, waveforms which can occur in operation of the converter. These waveforms comprise, for one cycle of period T at the switching frequency in typical normal operation of the converter, the control signals G2 and G1, voltage v1 and current i1 of the main switch 14, voltage v2 and current i2 of the auxiliary switch 24, a current isec of the secondary winding of the transformer 16, and currents i36 and i42 of the diodes 36 and 42 respectively. For descriptive purposes, the switching cycle is assumed to start at a time t1 and is subdivided into seven sequential operating intervals, numbered 1 to 7, starting at times t1 to t7 respectively. Horizontal double-headed arrows indicate possible variations in the timing of the rising edge of the control signal G1 and the falling edge of the control signal G2.

In the following description, time is denoted by t, n is the primary-to-secondary turns ratio of the transformer 16, Lm is the magnetizing inductance of the transformer at the primary winding, La is the inductance of the inductor 40 (also including inductance of the inductor 28), Cs is the capacitance of the snubber capacitor 26, Ca is the capacitance of the auxiliary capacitor 38, and Ca>Cs. Vi represents the supply voltage +V, Vd represents a steady state drain voltage of the main switch 14 at the time t1, and Vo represents the output voltage at the terminals 12. As shown in FIG. 2, ia represents current of the series-connected capacitor 38 and inductors 40 and 28, and im represents current of the primary winding of the transformer 16. FIG. 2 also indicates the current isec of the secondary winding of the transformer 16. The following description relates to the operation of the converter substantially in each of the sequential intervals.

Interval 1 (t1 to t2) Immediately before the time t1, as described below for Interval 7, both of the switches 14 and 24 are off. At the time t1 the auxiliary switch 24 is turned on by the control signal G2; this turn-on occurs under zero current conditions because the auxiliary switch is in series with the inductance La. The snubber capacitor 26 is discharged from the voltage Vo in a resonant manner via the capacitor 38, inductor 40, inductor 28, and auxiliary switch 24, the voltage v1 across the main switch 14 and the snubber capacitor 26 decreasing in accordance with the equations:

$$v1(t) = \frac{CaVd}{Ca+Cs}\cos[\omega_n(t-t1)] + \frac{CsVd}{Ca+Cs} \tag{1}$$

-continued $$\omega = \cfrac{1}{\sqrt{\cfrac{LaCaCs}{Ca+Cs}}} \qquad (2)$$

The resonant current which discharges the snubber capacitor 26 and charges the resonant tank is given by:

$$ia(t) = \frac{\omega_n CaCsVd}{Ca+Cs}\sin[\omega_n(t-t1)] \qquad (3)$$

The transformer action of the auxiliary transformer 32 causes the current i36 to flow, proportional to the current ia, through the inductor 30a and the diode 36, so that the energy from the snubber capacitor is returned to the capacitor 22.

During Interval 1 there is zero current i1 through the main switch 14 because this is off and its body diode is reverse biased. The current isec of the secondary winding is also zero, and current for a load connected to the output terminals 12 is provided by the capacitor 20.

Interval 1 ends at the time t2, when the voltage v1 becomes zero. The duration of Interval 1 is therefore given by:

$$t2-t1 = \sqrt{\frac{LaCaCs}{Ca+Cs}}\cos^{-1}\left(\frac{-Cs}{Ca}\right) \qquad (4)$$

which implies that Ca should be larger than Cs. Thus a zero drain voltage v1 of the main switch 14 can always be achieved regardless of input and load conditions.

It is observed that in the known flyback converter of FIG. 1 the control signal G1 would turn on the main switch 14, and the control signal G2 would simultaneously turn off the auxiliary switch 24 with a switching loss, at a time corresponding to the time t2. In contrast, in the flyback converter of FIG. 2 the control signal G1 does not turn on the main switch until the time t3 as shown in FIG. 3 and described further below, although it could be turned on under zero voltage conditions at any time from t2 to t3, and the control signal G2 turns off the auxiliary switch 24 in Interval 3 between the times t3 and t4.

Interval 2 (t2 to t3)

At the time t2, the body diode of the main switch 14 begins to conduct the current ia and clamps the main switch voltage v1 at zero. FIG. 2 illustrates the current i1 in Interval 2 as being negative, indicating that this is flowing through the body diode of the main switch. The resonant tank circuit now excludes the snubber capacitor 26, so that the resonant frequency changes from $\omega_n$ to $\omega_a$ which is given by:

$$\omega_a = \frac{1}{\sqrt{LaCa}} \qquad (5)$$

and the resonant current ia is given by:

$$ia(t)=A\cos[\omega_a(t-t2)]-B\sin[\omega_a(t-t2)] \qquad (6)$$

where:

$$A=Vo\sqrt{(Ca-Cs)Cs/LaCa},\ B=CsVd/\sqrt{LaCa} \qquad (7)$$

During Interval 2 the current i36 proportional to the current ia continues to flow in the inductor 30a and the diode 36, there is zero current isec in the secondary winding, and load current is supplied by the capacitor 20. The end of Interval 2 occurs when the current ia becomes zero and starts to reverse direction. The duration of Interval 2 is therefore given by:

$$t3-t2=\sqrt{LaCa}\tan^{-1}[\sqrt{Ca-Cs/Ca}] \qquad (8)$$

Interval 3 (t3 to t4)

At the time t3 (or between the times t2 and t3), the main switch 14 is turned on by the control signal G1 under zero voltage conditions. The reversing current ia deviates from the body diode to the drain-source path of the main switch 14, and continues to be determined in accordance with equation (6) above. The reversed polarity of the current ia causes a reversal of the polarity at the inductors 30a and 30b, so that the diode 36 is reverse biased and the diode 42 becomes forward biased. Consequently the current i36 becomes zero and the inductor 30b and the diode 42 conduct the current i42 proportional to the current ia.

Figure 3:
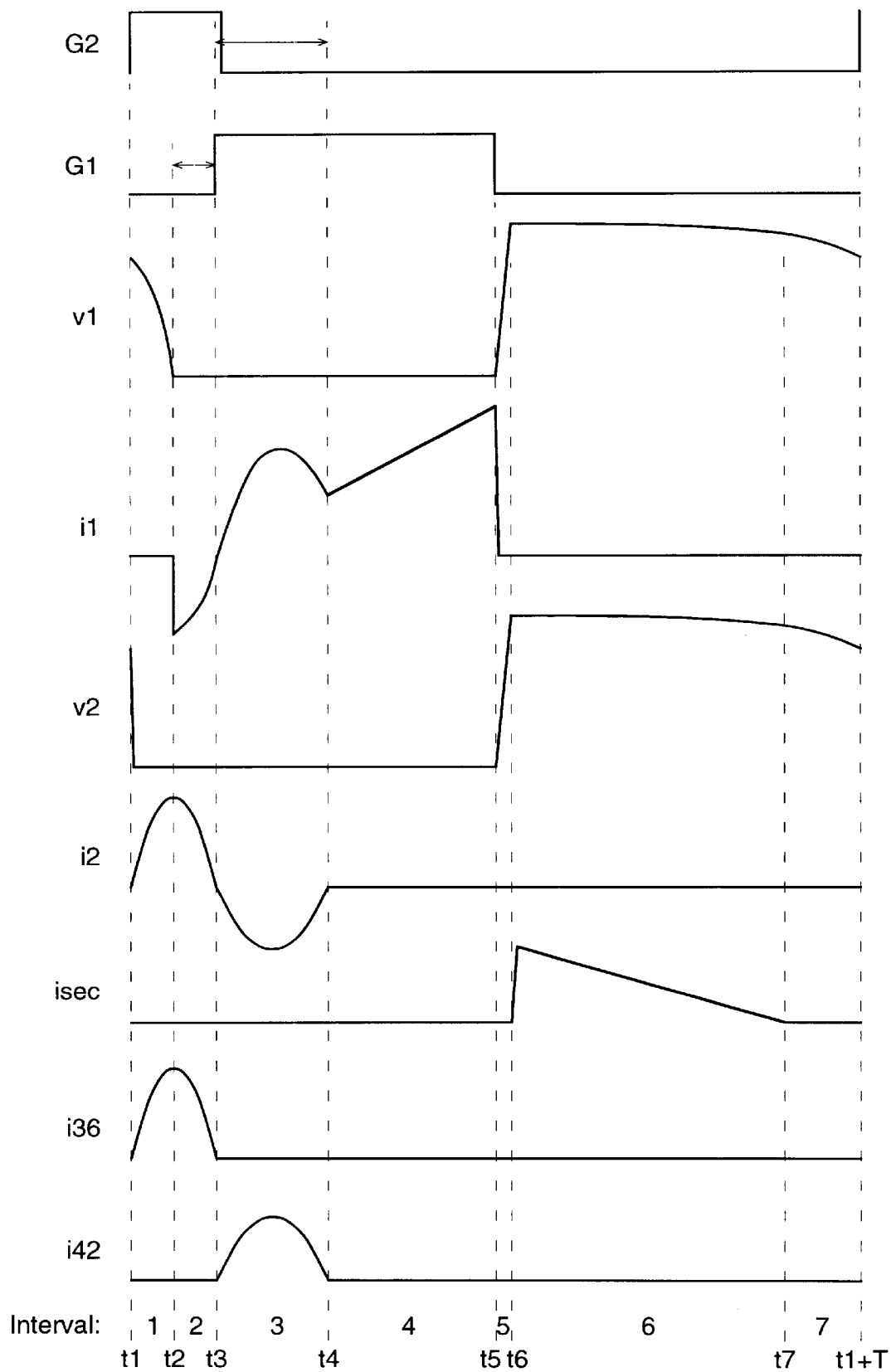
FIG. 3 illustrates operating waveforms of the converter of FIG. 2.

At or preferably shortly after the time t3, within Interval 3 as shown in FIG. 3, the auxiliary switch 24 is turned off by the control signal G2. As the reversed current ia now flows via the body diode of the auxiliary switch 24, as shown by the negative part of the current i2 in FIG. 3, the voltage v2 across the auxiliary switch 24 is substantially zero so that ZVS turn-off of this switch 24 is achieved. The precise timing of the falling edge of the control signal G2 to turn off the auxiliary switch 24 is not critical, and this can be delayed relatively arbitrarily within the duration of Interval 3. Thus the auxiliary switch 24 is turned off at or after the time t3, which is the latest time that the main switch 14 is turned on, and before or at the time t4 at which the resonant current ia reaches its second zero, as shown by the current i2 in FIG. 3.

As the main switch 14 is on, the inductance Lm at the primary winding of the transformer is supplied with a constant voltage Vi, so that its current im starts to rise linearly in accordance with:

$$im(t)=Vi/Lm(t-t3) \qquad (9)$$

and the drain current i1 of the main switch 14 is given by:

$$i1(t)=im(t)-ia(t) \qquad (10)$$

During Interval 3, the capacitor 20 continues to supply the load current, and the secondary current isec continues to be zero. Interval 3 ends when the current ia again becomes zero. Since at this time the auxiliary switch 24 has been turned off by the control signal G2, the resonant process is interrupted.

Interval 4 (t4 to t5)

The operation of the converter in Interval 4 is substantially that of a conventional flyback converter, because the resonant process is interrupted at the time t4. Thus the current im in the primary winding of the transformer 16, which is now the same as the current i1 of the main switch 14, continues to rise linearly in accordance with equation (9) above, until the end of the duty cycle of the converter, determined by the control signal G1 becoming zero at the time t5. During Interval 4, load current continues to be supplied by the capacitor 20.

Interval 5 (t5 to t6)

At the time t5 the main switch 14 is turned off by the control signal G1, the snubber capacitor 26 slowing the rate of change of the voltage v1 to provide substantially ZVS for the turn-off of the main switch 14. The voltage v1 is determined by the equations:

$$v1(t) = Vi\left\{1 + \frac{\omega_o D}{f}\sin[\omega_o(t-t5)] - \cos[\omega_o(t-t5)]\right\} \quad (11)$$

$$\omega_o = \frac{1}{\sqrt{LmCs}} \quad (12)$$

where D is the duty cycle of the control signal G1 and hence of the main switch 14, and f is the switching frequency of the converter.

The secondary winding of the transformer 16 now sees a voltage proportional to (v1-Vi). Interval 5 ends when this secondary voltage reaches the output voltage Vo of the converter at the terminals 12. Until then, the diode 18 remains reverse biased, and load current continues to be supplied by the capacitor 20.

Interval 6 (t6 to t7)

At the time t6 the diode 18 becomes forward biased and starts to conduct, so that as in a conventional flyback converter the energy stored in the core of the transformer 16 is transferred to the output and charges the capacitor 20. As the secondary winding of the transformer 16 now sees a constant voltage Vo, the drain voltage v1 of the main switch 14 is clamped at $$v1(t)=|Vi+nVo \quad (13)$$

Figure 4:
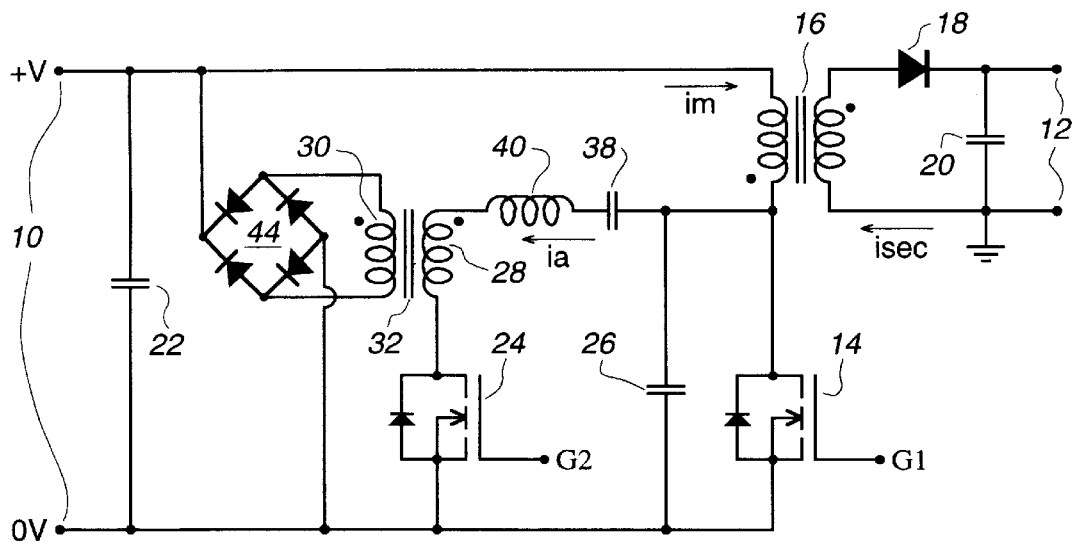
FIGS. 4 and 5 schematically illustrate flyback converters in accordance with other embodiments of the invention.
Figure 5:
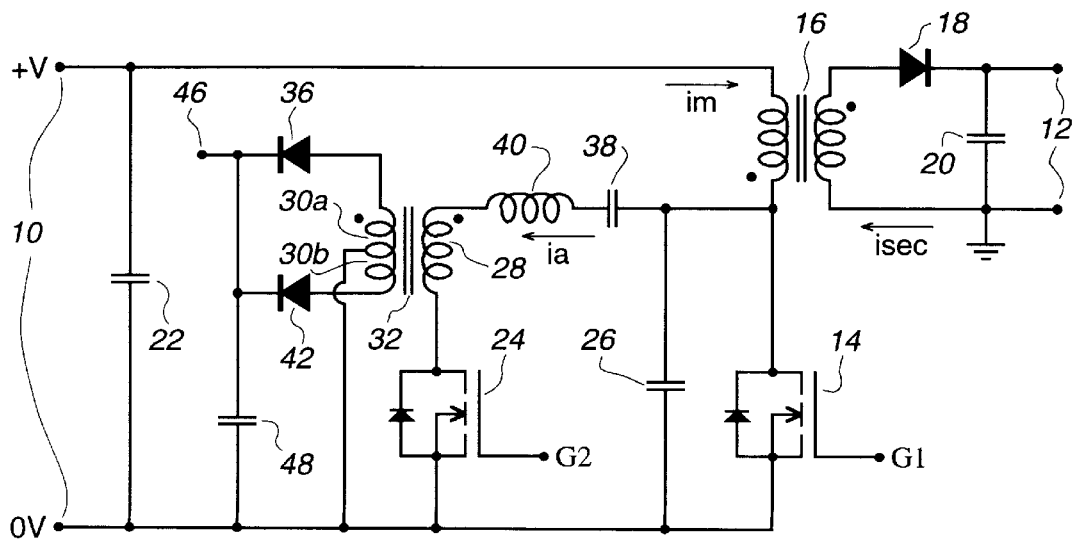

The secondary winding current isec consequently decreases linearly from a peak value Is, in accordance with the equations:

In the flyback converters of FIGS. 2, 4, and 5 as described above the inductor 28 is connected in series with the inductor 40. This facilitates the provision of the desired inductance La of the inductor 40 and the desired turns ratio of the auxiliary transformer 32. However, it can be appreciated that the inductors 28 and 40 can be combined as a single inductor. It can also be appreciated that a different series order of the auxiliary switch 24, capacitor 38, and inductors 28 and 40 can be provided without changing the functions of these components. Furthermore, the polarities and types of switches used can be different from those described above. In the event that alternative switches which may be used do not incorporate reverse parasitic or body diodes as described above, separate diodes can be provided.

In addition, although as described above the snubber capacitor 26 is coupled in parallel with the main switch 14, the snubber capacitor can alternatively be coupled in parallel with the primary winding of the transformer 16, or in parallel with another winding such as the secondary winding or an auxiliary winding (not shown) of this transformer. In any event, the snubber capacitor is coupled directly or indirectly to the main switch 14 for limiting the rate of change of voltage of the main switch, in order to facilitate ZVS turn-off of the main switch. With such alternative arrangements of the snubber capacitor 26, the series-connected capacitor 38, inductors 28 and 40, and auxiliary switch 24 are rearranged so that they are still coupled, directly or indirectly, to the snubber capacitor for resonantly discharging the snubber capacitor, in response to the auxiliary switch being turned on when the main switch is off, in a similar manner to that described above to facilitate ZVS turn-on of the main switch 14. Soft switching of the auxiliary switch and recovery of energy of the snubber capacitor are then provided in a manner similar to that described above.

Thus although particular embodiments of the invention have been described in detail, it can be appreciated that alternatives such as those mentioned above and numerous other changes, variations, and adaptations may be made without departing from the scope of the invention as defined in the claims.

What is claimed is:

1. A method of operating a flyback converter comprising a main switch, coupled in series with a primary winding of a transformer to supply voltage terminals, an output circuit coupled to a secondary winding of the transformer for providing an output voltage of the converter controlled by a duty cycle of the main switch, and a snubber capacitor for the main switch, comprising the steps of, in each switching cycle of the flyback converter:

turning on an auxiliary switch when the main switch is off to provide a resonant circuit comprising the snubber capacitor and a capacitance and an inductance coupled in series with the auxiliary switch, thereby to reduce a voltage of the main switch to substantially zero;

turning on the main switch while its voltage is substantially zero;

maintaining a resonant circuit of the capacitance and the inductance via the auxiliary switch and the main switch after the voltage of the main switch is substantially zero, whereby a current of the inductance reverses polarity at a first zero value and reaches a second zero value;

turning off the auxiliary switch at or after the first zero value and before or at the second zero value of the current of the inductance;

turning off the main switch at a time determined by the duty cycle; and recovering energy from the inductance.

2. A method as claimed in claim 1 wherein each of the switches comprises a switching path and an oppositely-poled diode in parallel with the switching path.

3. A method as claimed in claim 2 wherein the auxiliary switch is turned off under zero voltage conditions between the first and second zero values of the current of the inductance.

4. A method as claimed in claim 2 wherein the step of recovering energy from the inductance comprises full wave rectifying a current derived from an inductor coupled to said inductance.

5. A flyback converter comprising:

a transformer having primary and secondary windings;

a main switch coupled in series with the primary winding between supply voltage terminals;

an output circuit coupled to the secondary winding for providing an output voltage of the converter controlled by a duty cycle of the main switch;

a snubber capacitor coupled to the main switch for reducing a rate of change of voltage of the main switch; and an auxiliary circuit for recovering energy from the snubber capacitor, the auxiliary circuit comprising:

an auxiliary switch, an auxiliary capacitor, and a first inductor coupled in series to provide a resonant circuit with the snubber capacitor when the auxiliary switch is on and to maintain a resonant circuit of the auxiliary capacitor and the inductor after the main switch is turned on;

a second inductor coupled to the first inductor; and a full wave rectifier arrangement coupled to the second inductor.

6. A converter as claimed in claim 5 wherein each of the main and auxiliary switches comprises a MOSFET having a reverse-poled diode in parallel with its drain-source path.

7. A converter as claimed in claim 5 wherein each of the main and auxiliary switches comprises a switching path and an oppositely-poled diode in parallel with the switching path.

8. A converter as claimed in claim 7 wherein each of the snubber capacitor and the auxiliary circuit is coupled in parallel with the main switch.

9. A converter as claimed in claim 8 wherein the first inductor comprises two inductors coupled in series, one of said two inductors being inductively coupled to the second inductor.

10. A converter as claimed in claim 5 and including a capacitor connected between the supply voltage terminals, wherein the full wave rectifier arrangement is coupled to the supply voltage terminals for recovering energy from the snubber capacitor to the capacitor connected between the supply voltage terminals.

11. A converter as claimed in claim 5 and including auxiliary output terminals and a capacitor connected between the auxiliary output terminals, wherein the full wave rectifier arrangement is coupled to the auxiliary output terminals for recovering energy from the snubber capacitor to the capacitor connected between the auxiliary output terminals.

12. A converter as claimed in claim 5 wherein the second inductor comprises a tapped inductor and the full wave rectifier arrangement comprises two diodes each connected to one end of the second inductor.

13. A converter as claimed in claim 5 wherein the full wave rectifier arrangement comprises a diode bridge connected to the second inductor.

14. A flyback converter comprising:
- a first capacitor connected between supply voltage terminals;
- a transformer having primary and secondary windings;
- a main switch comprising a MOSFET having a drain-source path coupled in series with the primary winding between the supply voltage terminals, a reverse-poled diode in parallel with the drain-source path, and a gate for receiving a first control signal;
- an output circuit coupled to the secondary winding for providing an output voltage of the converter controlled by a duty cycle of the first control signal;
- a snubber capacitor coupled in parallel with the main switch; and
- an auxiliary switch, a second capacitor, and a first inductor, coupled in series with one another in parallel with the main switch and the snubber capacitor, the auxiliary switch comprising a MOSFET having a drain-source path, a reverse-poled diode in parallel with the drain-source path, and a gate for receiving a second control signal.

15. A converter as claimed in claim 14 and including a second inductor coupled to the first inductor, and a full wave rectifier arrangement coupling the second inductor to the first capacitor.

16. A converter as claimed in claim 15 wherein the first inductor comprises two inductors coupled in series, one of said two inductors being inductively coupled to the second inductor.

17. A converter as claimed in claim 15 wherein the second inductor comprises a tapped inductor and the full wave rectifier arrangement comprises two diodes each connected between one end of the second inductor and one of the supply voltage terminals.

18. A converter as claimed in claim 15 wherein the full wave rectifier arrangement comprises a diode bridge connected between the second inductor and the first capacitor.

19. A converter as claimed in claim 14 and including auxiliary output terminals, a third capacitor connected between the auxiliary output terminals, a second inductor coupled to the first inductor, and a full wave rectifier arrangement coupling the second inductor to the third capacitor.

20. A converter as claimed in claim 19 wherein the first inductor comprises two inductors coupled in series, one of said two inductors being inductively coupled to the second inductor.

* * * * *